Patented Sept. 13, 1932

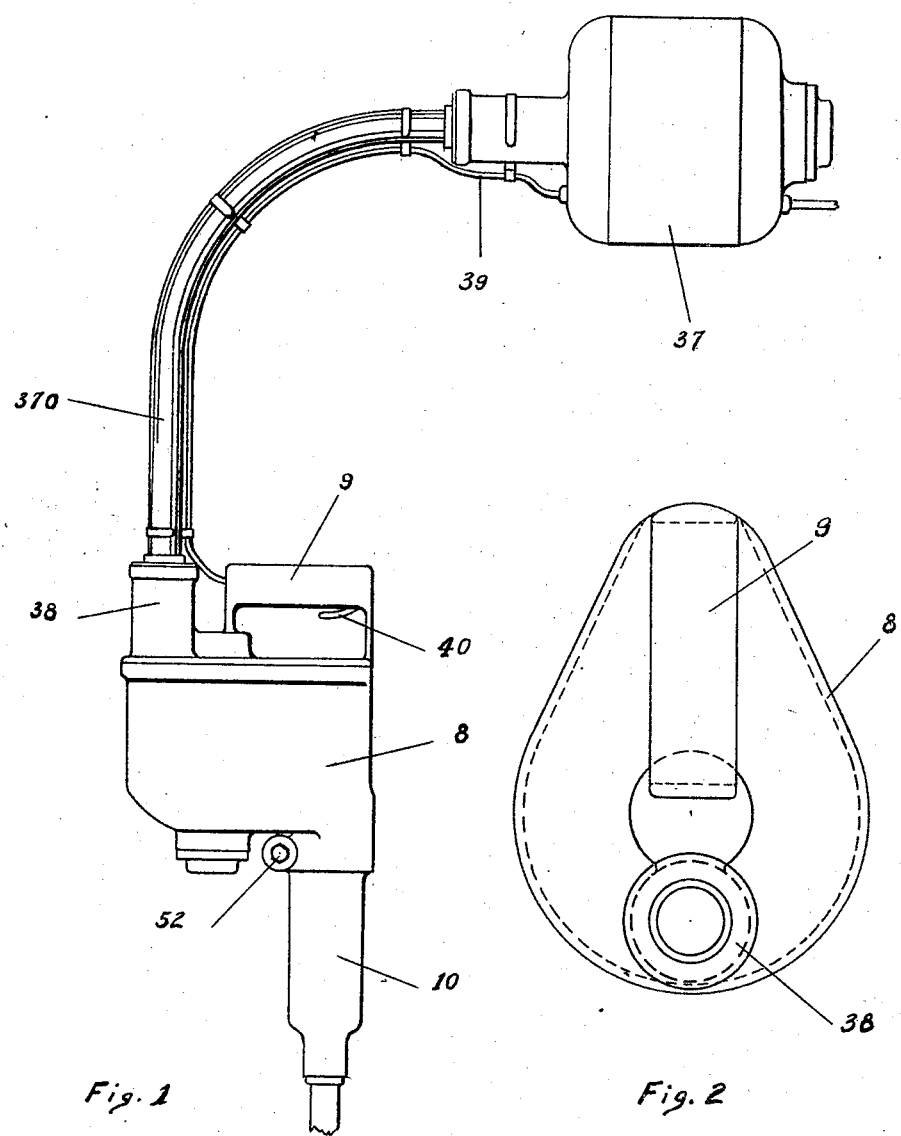

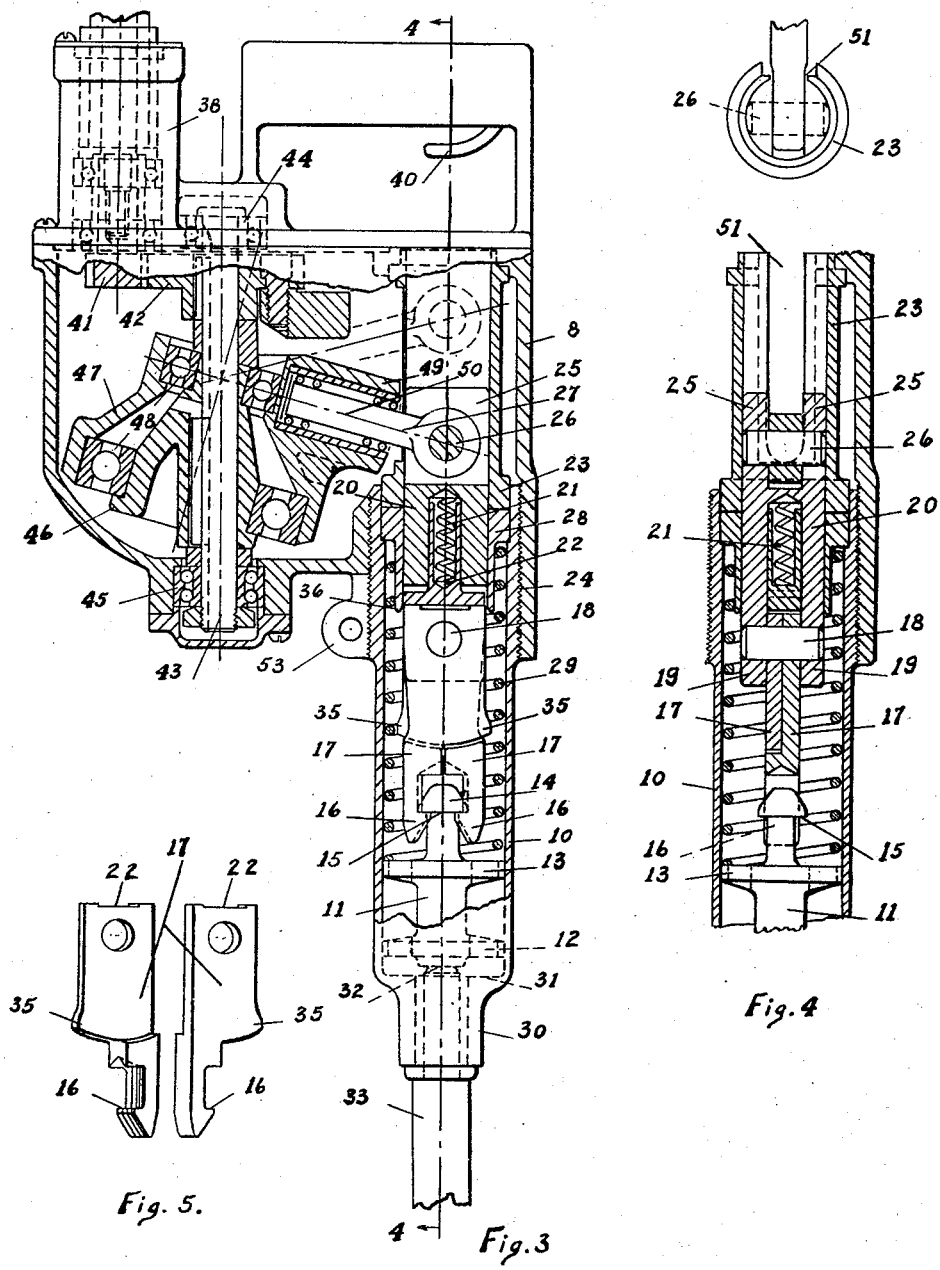

1,877,462

UNITED STATES PATENT OFFICE

ROY HOLLE, OF CINCINNATI, OHIO

MECHANICAL HAMMER

Application filed January 13, 1931. Serial No. 508,416.

The present invention relates to mechanical hammers of a mechanism whereby an impact member which is under the influence of a suitably heavy compression spring at all times may be lifted against the resistance of said spring and liberated whereby the impact stroke is accomplished solely through the stored energy of the spring under compression.

Another object is to provide a mechanical hammer mechanism of this type whereby the movement just described is repeated with great rapidity and is initiated from a suitable rotary power source.

Another object of the invention is to provide means whereby rotary motion from the power source is translated into smooth, rapid, reciprocation of the piston member including the means to grip, raise and release an impact member repeatedly and rapidly in its cycle of movement.

These and other object are attained by the means described herein and disclosed in the accompanying drawings, in which:

Fig. 1 is a side elevational view of a device embodying the present invention and including power operating means therefor.

Fig. 2 is an end elevational view of a device of the invention.

Fig. 3 is a longitudinal cross sectional view of the device.

Fig. 4 is a view taken on line 4—4 of Fig. 3.

Fig. 5 is a perspective view of the gripper members forming a detail of the invention.

The present invention consists in the provision of a suitably guided reciprocating impact member which is under the influence of a compression spring at all times and associated with a gripping means whereby the impact member may be lifted against the resistance of the spring for storing energy in the spring and means for releasing the impact member from the gripping means whereby the impact member may deliver an impact stroke solely under the influence of the stored up spring energy. The reciprocation of the gripping member is effected through the intermediary of a swash plate mechanism driven from any suitable rotary source of power such as an electric motor. Referring to the drawings, the present embodiment of the invention includes a housing 8 provided with a suitable grip or handle 9 opposite which is a hollow cylinder 10. An impact member 11 has suitable bearing flanges 12 and 13 which ride smoothly on the inner wall of the cylinder 10. A tapered head 14 on the impact member 11 is undercut to provide a shoulder 15 upon which the hooks 16 of a pair of gripper members 17 may engage. Gripper members 17 are mounted after the fashion of a pair of tongs upon a pin 18 and are disposed between the arms 19 of a piston 20. A spring 21 seated in a counterbore at the rear of arms 19 rests in notches 22 at the top of gripper member 17 whereby the hooks 16 are normally urged to the position shown in Fig. 3. The piston 20 is reciprocably mounted within a sleeve 23 which has one end extending into the top of cylinder 10. Cylinder 10 is screw-threaded into a threaded bore 24 in the housing 8. The piston 20 also has at its upper end a pair of spaced arms 25 which support a pin 26 that provides a pivotal mounting for a finger 27. A tubular thimble 28 has a bore concentric with sleeve 23 and also provides a bearing for the piston 20 during part of its movement. This thimble is seated in an enlarged bore interiorly of the housing 8 and forms an abutment for the top of a heavy compression spring 29. The bottom end of the compression spring seats upon the bearing flange 13 of the impact member 11 so that the latter member is always urged to the downward or outward limit of movement. The end of cylinder 10 has a reduced hollow tool receiving portion 30 which provides an internal shoulder 31 at its juncture with the remainder of cylinder 10. When the bearing flange 12 of impact member 11 is seated on shoulder 31 the spring 29 is under practically no compression. In the position shown in Fig. 3 it will be noted that the piston 20 and the gripper member 17 are at their lowermost limit of reciprocation. It is to be observed then that only when the shank 32 of a tool 33 is pressed against impact member 11 to move impact member 11 upwardly against spring 29 can the gripper hooks 16 engage the shoulder 15 of the impact member. For this reason when the tool is not held firmly into the hammer, the mechanism will run idle without effecting any reciprocation of the impact member.

It will be observed that each of the gripper members 17 is provided with an ear 35 which will engage the end 36 of thimble 28 as the piston reaches its upward limit of movement. This effects a release or spreading of the gripper members so that the hooks are disengaged from the shoulder 15 on the head 14. At the upper limit of movement of the impact member 11 the spring 29 has been compressed to its utmost and, upon release of the hooks as stated the impact member is projected to substantially the opposite limit of its movement where it strikes the end 32 of the tool shank with a maximum velocity.

While several different means may be employed for effecting the reciprocation of the piston 20, the preferred form herein shown is employed because it requires a minimum of power for operation and furthermore because its operation is relatively smooth and quiet. The power source may be an electric motor 37 having a suitable flexible drive shaft enclosed in the usual tubular casing 370 which is connected at the hollow coupling nipple 38 adjacent handle 9. The electrical conductor 39 for the motor may be controlled by a suitable switch contained in the handle 9 and controlled by a trigger 40 (see Fig. 1).

Referring now to Fig. 3, a pinion 41 on a suitable stud shaft, coupled to the flexible drive within the coupling nipple 38, drives a gear 42 which is mounted on shaft 43. The latter is preferably journalled at opposite ends in ball-bearings 44 and 45. The power translating mechanism is in the nature of a swash plate-device and consists of a pair of concentric members, namely, a rotating inner member 46 and an oscillating outer member 47. Member 46 has the shaft 43 passing through it on a center which is oblique to the geometric axis of member 46. Member 47 is hollow and has interior peripheral bearings for example ball-bearings 48, surrounding the member 46. When member 46 is rotated, the member 47 has imparted thereto a wabbling motion. In a suitable extension 49 of member 47 there is provided a suitable bearing socket within which the cylindrical end 50 of finger 27 may have both limited turning and limited reciprocating movement. With the finger 27 pivoted to the piston 20 by means of pin 26, and extending through a slot 51 in sleeve 23 the wabbling movement of member 47 effects a reciprocation of piston 20.

The invention herein is not to be considered as limited to the exact structural details shown, since they may be modified within the spirit and scope of the present invention.

The operation of the device is understood to be as follows:

When the hammer is to be used the motor is connected to a suitable source of electric current (not shown) and remains at rest until the finger trigger 40 is depressed. Rotation of the flexible shaft in the casing 37 drives pinion 41 by direct coupling and this turns shaft 43 through the agency of gear 42. The member 46 is then rotated because of its connection with shaft 43 and the member 46 rotates within the concentric member 47. Member 47 however, is held against rotation with member 46 so that the latter merely effects a wabbling movement which is translated into rectilinear reciprocation of the piston 20 by means of finger 27.

Considering now that the reciprocation of piston 20 has been initiated, the actual operation of the impact member will now be described.

If the operator now inserts the tool 33, for example a chisel or concrete cutting tool, in the socket and holds it lightly against the work with switch trigger 40 depressed, the piston 20 will be rapidly reciprocated but head 14 of the impact member will not be reached by the hooks 16. When the operator presses the hammer against the tool enough to slightly compress the spring and bring the head 14 within proper reach of the hooks, said hooks, at the lower limit of the piston stroke will be spread apart by the head and will engage beneath the head as the piston returns. The impact member is now carried up by the hooks and the spring 29 is placed under compression. At about the upward limit of movement of the piston, i. e. at zero velocity of the piston, the ears 35 of the hooks will have been depressed against the end 36 of the thimble 28 causing an opening or spreading apart of the hooks, whereupon the impact member 11 is violently projected against the end 32 of the tool, thus delivering its work stroke. The piston quickly follows the free impact member on its downward stroke and, when the impact member is at rest and the hooks are just approaching a state of rest, they are again spread apart and snap over the head 14 to repeat the cycle of operations.

Contrary to expectation, the hooks 16 and head 14 as well as ears 35 and edge 36 of the thimble show no wear after a long period of use, even though all of the parts are made of relatively soft steel. These parts however, may be hardened in order to provide practically an indefinite period of use. The only part which may require replacement at long intervals is the inexpensive spring 29 which may have a strength of about twenty pounds or more when fully compressed.

The hollow cylinder 10 is screw threaded into the housing and is readily removed, replaced and adjusted. A pinch screw 52 controlling the slotted end 53 of housing 8 effectively holds the cylinder 10 in adjusted position.

What is claimed is:

1. In a portable mechanical hand hammer the combination with a suitable housing, of a hollow cylinder communicating therewith, an impact member having a shouldered head, said member reciprocable in the cylinder, a coil spring normally urging the impact member to the end of the cylinder, a power driven shaft in the housing, a piston reciprocable in axial alignment with the impact member, means actuated by the shaft for reciprocating the piston, a pair of gripping members yieldably urged to closed position and adapted to grip the impact member, said gripping members being carried by the piston, whereby the impact member is pulled into the cylinder against the resistance of the coil spring, and means whereby the gripping members are released from the impact member for subjecting the latter to the influence of the coil spring.

2. In combination with a hollow cylinder having a tool receiving socket at one end, of a power reciprocated piston in the cylinder, a pair of grippers pivoted together and carried by the piston, cooperating means on the grippers and cylinder for opening the grippers as the piston reaches one end of its path of travel, spring means disposed axially within the piston and yieldably resisting opening of the grippers, an impact member slidable in the cylinder, and a coiled compression spring urging the impact member toward the tool socket beyond the reach of the grippers.

3. In a portable mechanical power hammer the combination of a cylinder, a piston reciprocable therein, means to reciprocate the piston, a pair of gripper members pivoted together upon said piston, each of the gripper members having an ear intermediate its ends, a sleeve-like projection in the cylinder and surrounding the piston and spring means seated axially within the piston and serving to yieldably retain the gripper members in a closed position, the ears on said gripper members cooperating with the sleeve in the cylinder for effecting opening movement of the gripper members against the axially acting spring means.

In testimony whereof, I have hereunto subscribed my name this 10th day of January, 1931.

ROY HOLLE.